F. H. REEDER.
CORN PLANTER.
APPLICATION FILED MAY 14, 1913.
1,092,539.
Patented Apr. 7, 1914.
3 SHEETS—SHEET 1.
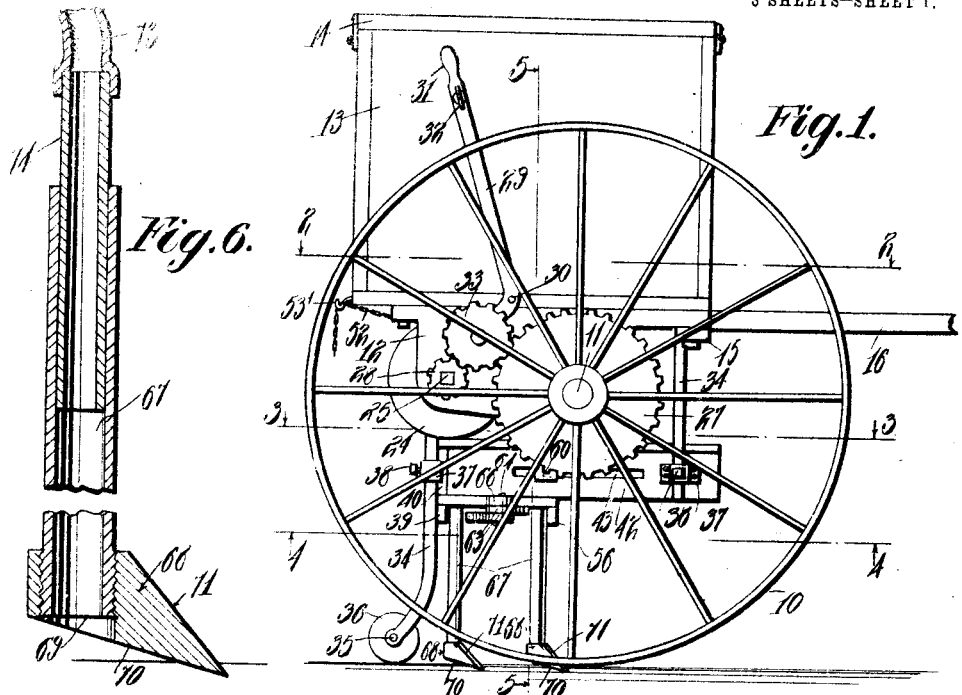
Fig. 6.
Fig. 1.
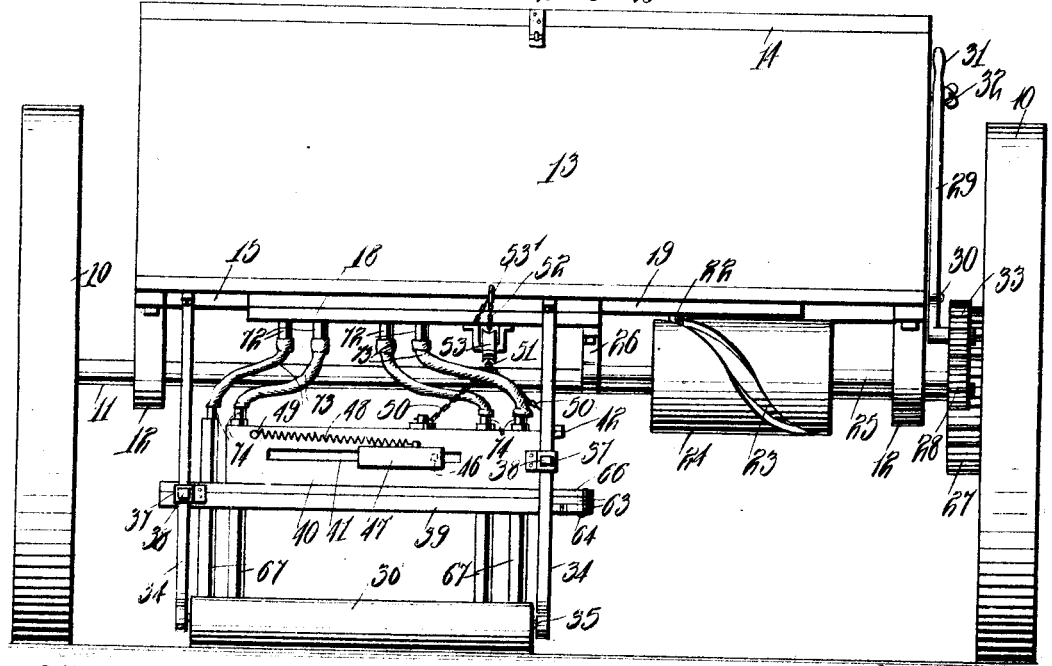
Fig. 7.
Witnesses
Inventor
F. H. Reeder,
By
Chandler & Chandler
Attorneys

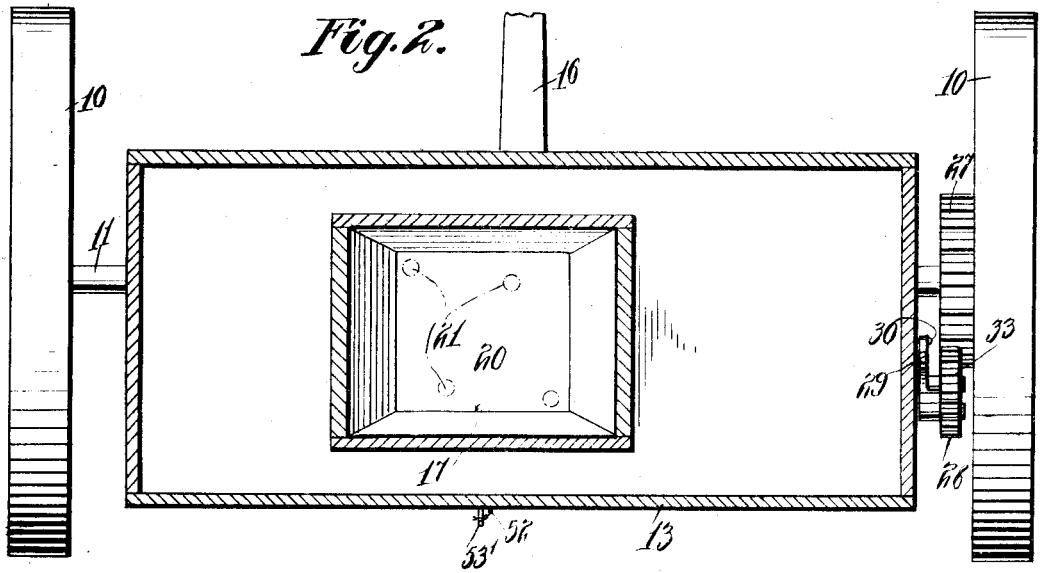
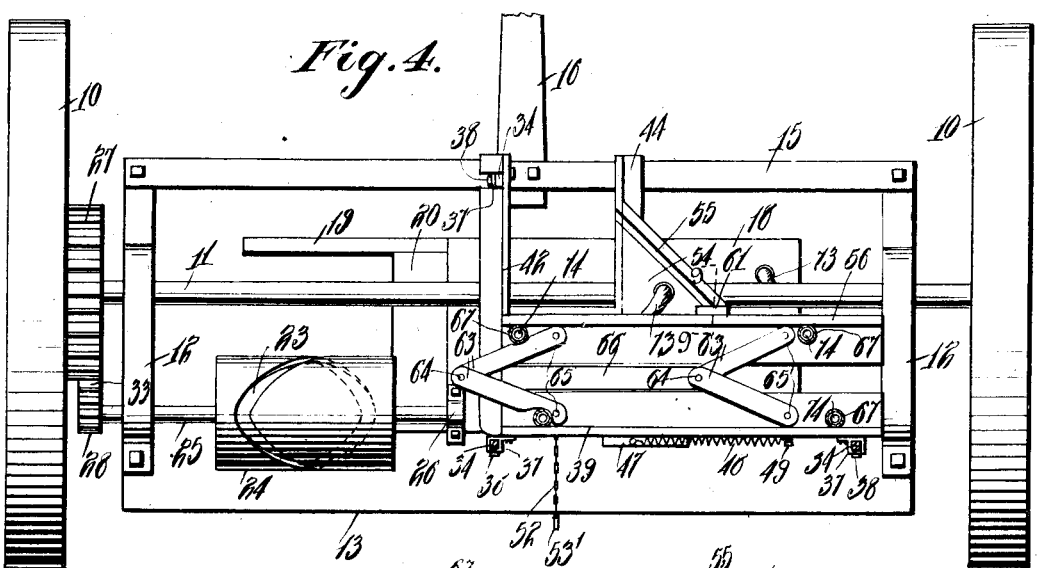
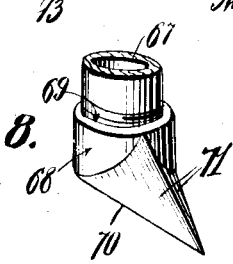

F. H. REEDER.
CORN PLANTER.
APPLICATION FILED MAY 14, 1913.

1,092,539.

Patented Apr. 7, 1914.
3 SHEETS—SHEET 3.

Witnesses

Inventor
F. H. Reeder,
By
Attorneys

UNITED STATES PATENT OFFICE.

FRANKLIN H. REEDER, OF PHILADELPHIA, PENNSYLVANIA.

CORN-PLANTER.

1,092,539. Specification of Letters Patent. Patented Apr. 7, 1914.

Application filed May 14, 1913. Serial No. 767,658.

*To all whom it may concern:*

Be it known that I, FRANKLIN H. REEDER, a citizen of the United States of America, residing at Philadelphia, in the county of Philadelphia, State of Pennsylvania, have invented certain new and useful Improvements in Corn-Planters; and I do hereby declare the following to be a full, clear, and exact description of the invention, such as will enable others skilled in the art to which it appertains to make and use the same.

This invention relates to corn planters and has special reference to a planter designed to plant four hills arranged at the corner of a rectangle, the four hills being planted simultaneously.

The principal object of the invention is to improve and simplify the general construction of devices of this character.

A second object of the invention is to provide a seed carrier of improved construction and operatively arranged to deliver four separate lots of grains to four separate dropping tubes simultaneously.

A third object of the invention is to provide improved means for varying the distances between the hills.

A fourth object of the invention is to provide improved support and adjusting means for such a device.

With the above and other objects in view the invention consists in general of certain novel details of construction and combination of parts hereinafter fully described, illustrated in the accompanying drawings, and specifically claimed.

Figure 3:
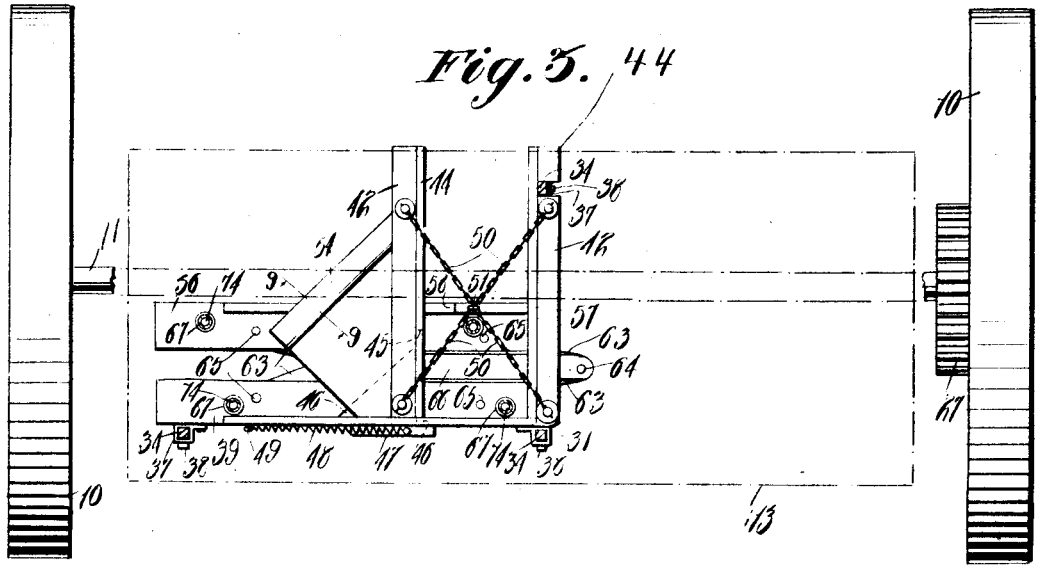
Figure 5:
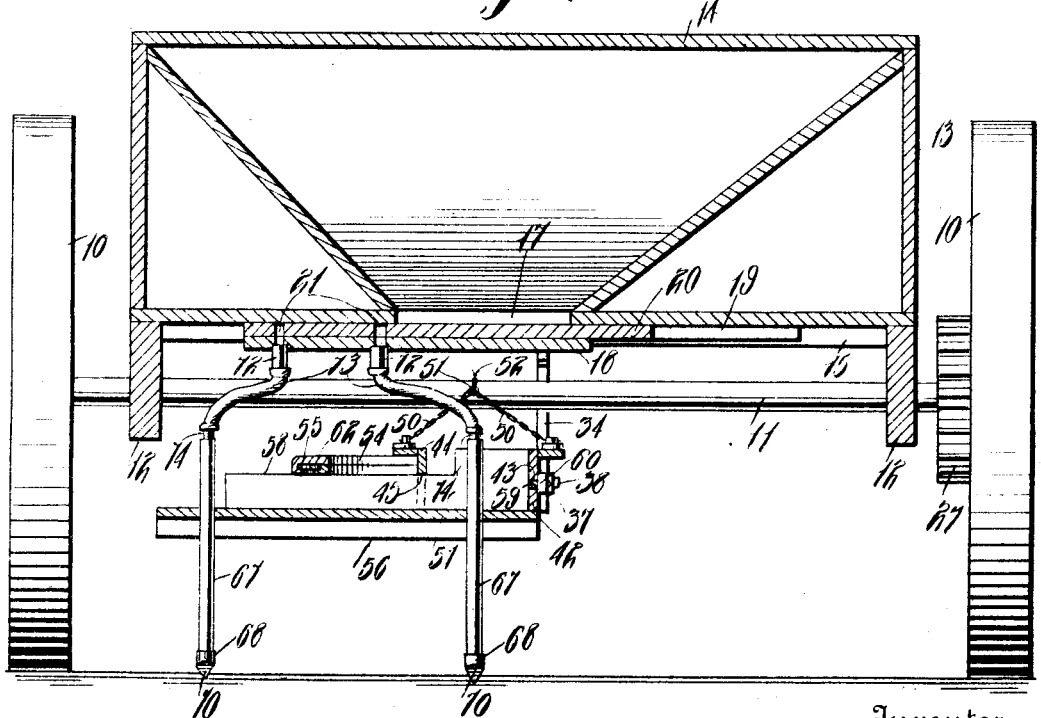

In the accompanying drawings, like characters of reference indicate like parts in the several views, and Figure 1 is a side elevation of a planter constructed in accordance with this invention. Fig. 2 is a section on the line 2—2 of Fig. 1. Fig. 3 is a section on the line 3—3 of Fig. 1. Fig. 4 is a section on the line 4—4 of Fig. 1. Fig. 5 is a section on the line 5—5 of Fig. 1. Fig. 6 is a detail section through one of the ground opening devices. Fig. 7 is a rear view of the invention. Fig. 8 is a perspective view of one of the ground opening devices. Fig. 9 is a detail section on the line 9—9 of Fig. 3, showing a certain T pin and the slot wherein it fits.

In the embodiment of the invention herein shown there is provided a pair of ground wheels 10 one of which may be fixed to an axle 11 while the other rotates freely thereon so that the device may turn corners without dragging or slipping of one wheel with reference to the other, the fixed wheel constituting the driving wheel. On the axle 11 is supported a pair of side frames 12 whereon is mounted a seed hopper or box 13 provided with the usual cover 14. These frames are connected at their forward ends by a transverse member 15 to which is in turn connected the pole 16 for the draft animals. It will be obvious that a pair of shafts may be substituted for the pole, the showing being merely typical of suitable means for attachment of draft animals.

In the bottom of the hopper 13 is an opening 17 and beneath this hopper is a guide plate 18 which is held in spaced relation to the hopper bottom by means of strips 19. Between the guide plate and the hopper bottom is a seed plate 20 provided with four spaced seed pockets 21 arranged as shown in Fig. 2. Depending from the end of the seed plate is a lug 22 which is received in a groove 23 formed in the cylindrical surface of a cam 24 mounted on a shaft 25 which is supported by one of the side frames 12 and by a bracket 26 depending from the hopper 13.

Attached to the inside of the head of one of the wheels 10 is a driving gear 27 and on the shaft 25 is a pinion 28.

At 29 is indicated a bell crank lever which is pivoted to the hopper 13 at its angle portion by means of a pivot 30. One end of this bell crank lever is provided with an operating handle 31. This lever is secured in adjusted position by means of a suitably secured device here indicated as a wing screw 32 passing through the lever and engaging the side of the hopper. On the shorter arm of the lever 29 is mounted an idler gear 33 which is arranged to mesh with the gears 27 and 28 when the lever is moved to one position and to be free from these gears when the lever is moved to the other position.

Secured rigidly to the side frame members are standards 34 the bottoms of which are inclined rearwardly and support a shaft 35 whereon is mounted a ground roller 36 which is used to cover the seed after depositing, as will be explained hereafter.

Slidably mounted on the standard 34 are collars 37 which are held in adjusted position by set screws 38. Carried by these collars is a frame member 39 L-shaped in cross section and supported on this frame member is a plate 40 having a longitudinal slot 41 formed therein. Extending forwardly from the plate 40 and supported by said plate and the member 39 is an L-shaped frame member 42 provided with a longitudinal slot 43. Extending forwardly from the member 40 is a second L-shaped frame member 44 having its forward end cut away as at 45 for purpose hereinafter to be described. This second frame member is provided with a tongue 46 which projects through the slot 41 and is provided on its rear end with a head 47 whereby the member 44 is slidably mounted on the member 40 so that it may be moved to or from the member 42. These members are normally urged apart by means of a tension spring 48 secured at one end to the head 47 and at the other end to a lug 49 on the plate 40. In order to pull these members together pairs of chains 50 are connected to the respective members 42 and 44 and the four chains are united by a ring 51 so that upon drawing upward on the ring the pairs are drawn together in a parallel manner and jamming of the movable member 44 is prevented. To the ring 51 is connected a chain 52 which runs over a suitable pulley 53 to a hook or other fastening means as indicated at 53' the hook being arranged to pass through any link of the chain 52. Thus upon pulling upon the chain 52 the spring 48 is tensioned and the members 42 and 44 drawn together, while, upon loosening said chain, the spring pulls said members apart.

Secured to the tongue 46 and the member 44 is a plate 54 wherein is formed a T-shaped slot 55 extending at an angle of approximately 45° to the members 40 and 44.

Arranged in parallel relation to the member 39 is a movable tube supporting member 56 of similar shape to the member 39 and on this member 56 is mounted a plate 57 having a cut away portion 58 coacting with the cut away portion 45 so that the member 44 and plate 57 may cross and slide upon each other. The member 57 is provided with a tongue 59 which extends through the slot 43 and has on its end a head 60 whereby the plate 57 and frame member 56 may slide relative to the members 44 and 42. On the plate 57 is mounted a lug 61 carrying a T-shaped head pin 62 which fits in the slot 55. The members 39 and 56 are further connected by means of pairs of links 63, the links of each pair being connected together by a pivot 64 and to the respective members by pivots 65. Furthermore the pivots 64 are connected by a parallel motion bar 66 so that as the two members 56 and 39 move to and from each other they are at all times held parallel and it will be noted that the pin 62 and slot 55 cause the member 56 to move to and from the member 39 as the members 42 and 44 are moved from and to each other.

Secured to the members 39, 44 and 56 are dropper tubes 67 having their lower ends threaded and on the bottom of each of these dropper tubes is screwed an earth opening tool comprising the body portion 68 having the threaded opening 69 therein for the reception of the respective tube. The bottom face of this tube is slanted upwardly and rearwardly as indicated at 70 while the upper face of the tube is formed of two oppositely synclinally arranged surfaces 71 so that the three surfaces 70, 71 and 71 form a trihedral angle. By this means the earth is opened and spread to either side while a clear space is left for the dropping of the seed and the latter will not be crushed by the heel of the shoe or earth working tool. It will be seen that by adjustment of the sleeve 37 the earth working tools are all adjusted simultaneously.

Extending downward from the guide plate 18 are seed tubes 72 which are connected by flexible tubes 73 with tubes 74 telescopically mounted in the upper ends of the tubes 67 so that the vertical adjustment is permitted to the required degree.

In the operation of the device the idler gear 33 is thrown out of mesh with the gears 27 and 28. The sleeves or collars 37 are adjusted so that the earth working tools are raised above the ground. The device is then driven to the field which is to be planted. On arriving at the field and when in position to begin the planting the earth working tools are adjusted to proper depth. The idler gear 33 is then moved to connect the gears 27 and 28 and the machine is driven forward whereupon the seed plate 20 reciprocates and with each reciprocation delivers four lots of seed, one to each of the respective dropping tubes. The seed passes down these tubes and into the space or furrows formed by the passage of the earth working tools. It is obvious that the distances transversely and between the front and rear pair of tubes is to be adjusted prior to starting in case the distance already between the seed members is not that at which it is desired to plant the seed.

It will be noted that it is preferred to slightly stagger the dropper tubes so that one furrow is made slightly out of alinement with the other. As the machine passes along after the seed have been dropped the earth is closed in over said seed by the roller 36 this constituting the operation.

There has thus been provided a simple and efficient device of the kind described and of the character specified.

It will be obvious that many minor changes may be made in the form and construction of this invention without departing from the material principles thereof. It is not therefore desired to confine the invention to the exact form herein shown and described, but it is wished to include all such as come properly within the scope claimed.

It will be obvious that by varying the proportions of the gears 27 and 28 the distance between hills may be varied as desired.

Having thus described the invention, what is claimed as new, is:—

1. In a planter, a seed hopper, dropper tubes arranged in pairs beneath said hopper, means to vary the distance between said pairs of tubes, and means to deliver seed from the hopper to all four tubes simultaneously.

2. In a planter, a seed hopper, dropper tubes arranged in pairs beneath said hopper, means to vary the distance between said pairs of tubes, means to deliver seed from the hopper to all four tubes simultaneously, earth opening tools carried by the lower ends of said tubes, and an adjusting device arranged to vary the distance of said tools from said hopper simultaneously.

3. In a planter, a seed hopper, dropper tubes arranged in pairs beneath said hopper, means to vary the distance between said tubes, and a link device connected to said tubes to hold said pairs parallel.

4. In a planter, a seed hopper having an opening in its bottom, a reciprocable seed plate having openings therein arranged at the corners of a parallelogram, guide means beneath said hopper wherein said seed plate reciprocates, dropper tubes depending from said guide means and arranged to register with the openings in the plate at one point of its reciprocation, means to reciprocate said plate, a support including a pair of members mounted to move in parallel relation and carrying the lower end of said dropper tubes, and means for varying the distance between said supporting members.

5. In a planter, a seed hopper having an opening in its bottom, a reciprocable seed plate having openings therein arranged at the corners of a parallelogram, guide means beneath said hopper wherein said seed plate reciprocates, dropper tubes depending from said guide means and arranged to register with the openings in the plate at one point of its reciprocation, means to reciprocate said plate, a support including a pair of members mounted to move in parallel relation and carrying the lower end of said dropper tubes, means for varying the distance between said supporting members, brackets connected to said hopper, and adjusting means connecting said brackets and support.

6. In a planter, a dropper tube support comprising a pair of spaced members, a parallel link motion connecting said members, a second pair of parallel members extending at equal angles to the first pair, an operative connection between the first and second pair of members to move one of said pairs as the other is moved, and means to move the members of one pair to and from each other.

7. In a planter, a dropper tube support comprising a member provided with a longitudinally extending slot; a second member parallel to the first member; a third member rigidly connected to the first member and extending at an angle therefrom, said third member being provided with a longitudinally extending slot; a tongue on the second member extending into the slot of the third member, a head on said tongue to hold the same in its slot; pairs of pivotally connected links connecting said first and second members, a parallel bar connecting the joints of the respective pairs of links; a fourth member extending parallel to the third member and provided with a tongue extending into the slot of the first member, a head on the last mentioned tongue to hold the same in its slot; an operative connection between the second and fourth members including an extension on one of said members provided with a diagonally arranged slot and a pin on the other member entering the last mentioned slot; means to move said third and fourth members to and from each other; and dropper tubes carried by a parallel pair of said members.

8. In a planter, a dropper tube support comprising a member provided with a longitudinally extending slot; a second member parallel to the first member; a third member rigidly connected to the first member and extending at an angle therefrom, said third member being provided with a longitudinally extending slot; a tongue on the second member extending into the slot of the third member, a head on said tongue to hold the same in its slot; pairs of pivotally connected links connecting said first and second members, a parallel bar connecting the joints of the respective pairs of links; a fourth member extending parallel to the third member and provided with a tongue extending into the slot of the first member, a head on the last mentioned tongue to hold the same in its slot; an operative connection between the second and fourth members including an extension on one of said members provided with a diagonally arranged slot and a pin on the other member entering the last mentioned slot; means to move said third and fourth members to and from each other comprising chains connected in pairs to said pair of members, a link connecting all of said chains, a fifth chain connected to said link, and a spring connected at one end to the heads on the fourth member and at its other end to a point on said first member; and dropper tubes carried by a parallel pair of said members.

In testimony whereof, I affix my signature, in presence of two witnesses.

FRANKLIN H. REEDER.

Witnesses:
 MAE SCHUMAN,
 JOHN B. RUTHERFORD.